United States Patent
Anderson

[11] Patent Number: 6,024,121
[45] Date of Patent: Feb. 15, 2000

[54] CHECK VALVE

[75] Inventor: Bo Anderson, Cambridge, N.Y.

[73] Assignee: Flomatic Corporation, Glen Falls, N.Y.

[21] Appl. No.: 09/219,986

[22] Filed: Dec. 23, 1998

[51] Int. Cl.⁷ .................................................. F16K 15/00
[52] U.S. Cl. ........................ 137/542; 137/515.7; 251/363
[58] Field of Search ................................ 137/542, 515.7; 251/359, 363, 362

[56] References Cited

U.S. PATENT DOCUMENTS

| | | | |
|---|---|---|---|
| 2,524,951 | 10/1950 | Ashton | 137/542 |
| 2,525,799 | 10/1950 | Hecker | 137/515.7 |
| 2,530,091 | 11/1950 | Smith | 137/542 |
| 2,621,885 | 12/1952 | Schmitt | 137/542 |
| 2,631,577 | 3/1953 | Carter | 251/363 |
| 2,856,958 | 10/1958 | Smolensky | 137/542 |
| 2,882,925 | 4/1959 | Smolensky | 137/542 |
| 2,928,417 | 3/1960 | Buckner et al. | 251/363 |
| 2,932,531 | 4/1960 | Briechle | 251/363 |
| 3,378,030 | 4/1968 | Cary | 137/516.29 |
| 3,612,097 | 10/1971 | Prince. | |
| 4,552,335 | 11/1985 | Alexander et al. | 251/363 |
| 4,605,041 | 8/1986 | Teumer | 137/527 |
| 4,763,834 | 8/1988 | Duprez | 251/363 |
| 5,018,664 | 5/1991 | Butler | 251/363 |
| 5,080,120 | 1/1992 | Jordan | 251/363 |
| 5,118,075 | 6/1992 | Portolese | 251/363 |
| 5,137,050 | 8/1992 | Clarke et al. | 137/541 |
| 5,215,118 | 6/1993 | Scaramucci | 137/515.5 |
| 5,226,445 | 7/1993 | Surjaatmadja | 137/542 |
| 5,247,960 | 9/1993 | Kornfeldt et al. | 251/363 |
| 5,335,921 | 8/1994 | Orlowski | 277/30 |
| 5,482,080 | 1/1996 | Bergmann | 137/549 |
| 5,664,602 | 9/1997 | Madrid | 137/515.7 |

Primary Examiner—Denise L. Ferensic
Assistant Examiner—Joanne Y. Kim
Attorney, Agent, or Firm—Heslin & Rothenburg, P.C.

[57] ABSTRACT

A check valve having a valve housing with a pair of opposite end faces including an upstream end face and a downstream end face. The valve housing has a fluid passage extending axially therethrough between the upstream end face and the downstream end face. A first seating surface is formed within the valve housing around the fluid passageway and adjacent to the upstream end face. A seating ring is provided having a second seating surface adapted to engage the first seating surface when the seating ring is disposed in engagement with the valve housing. An o-ring is sized to reside between the first seating surface and the second seating surface when the seating ring and valve housing are placed in engagement to maintain the seating ring and valve housing in fixed relation to each other notwithstanding an outward axial biasing force thereon. At least one of the first seating surface and the second seating surface includes a retaining lip which ensures that the o-ring remains axially fixedly positioned between the first seating surface and the second seating surface.

15 Claims, 4 Drawing Sheets

CHECK VALVE

TECHNICAL FIELD

This invention relates generally to valves, and more particularly, to an improved check valve design, such as for a wafer style or piston-type check valve.

BACKGROUND OF THE INVENTION

A general need exists for devices to prevent return flow of fluid, for instance under conditions of under pressure, in order to prevent the penetration of air into a fluid supply line, or the return to the supply duct of a fluid which has already passed therethrough. In water supply applications, there is significant interest in preventing a return flow of water into the supply line, since the water quality may degrade due to the return flow. In order to prevent return flow, it is known to use check valves whose moveable valve closing members are subjected to spring action in the direction of a valve seat which is provided in the housing of the check valve. Examples of check valves are provided in U.S. Pat. Nos. 3,378,030; 3,612,097; 4,605,041; 5,482,080; and 5,664,602, as well as the patents referenced therein.

Despite the existence of a large number of check valve designs, there is a continuing need for enhanced, simple, reliable check valve designs. The present invention is thus directed to providing an enhancement to the existing state of check valve designs.

DISCLOSURE OF THE INVENTION

Briefly summarized, the invention comprises in one aspect a check valve which includes a valve housing having a pair of opposite end faces comprising an upstream end face and a downstream end face with a fluid passage extending axially through the valve housing between the upstream end face and the downstream end face. A first seating surface is formed within the valve housing around the fluid passageway and adjacent to the upstream end face. A seating ring is provided having a second seating surface adapted to engage the first seating surface, and an o-ring is sized to reside between the first seating surface and the second seating surface when the seating ring and the valve housing are placed in engagement to seal fluid from passing between the first seating surface and the second seating surface and to maintain the seating ring and valve housing in fixed relation to each other, notwithstanding the existence of an outward axial biasing force against the seating ring imparted by a spring mechanism which resides within the valve housing.

In a further aspect, a method of manufacturing a check valve is provided which includes: providing a valve housing having a pair of opposite end faces comprising an upstream end face and a downstream end face, and a fluid passage extending axially through the valve housing between the upstream end face and the downstream end face, and wherein a first seating surface is formed within the valve housing around the fluid passageway and adjacent to the upstream end face; providing a seating ring having a second seating surface adapted to engage the first seating surface, and a disk-shaped poppet adapted to sealingly engage the seating ring; providing a spring-biasing mechanism for biasing the disk-shaped poppet against the seating ring; providing an o-ring sized to compressively reside between the first seating surface and the second seating surface when the seating ring and the valve housing are placed in engagement; and assembling the valve housing, seating ring, disk-shaped poppet, spring-bias mechanism and o-ring by disposing the spring-bias mechanism and the disk-shaped poppet within the valve housing such that the disk-shaped poppet is spring-biased towards the upstream end face, and placing the seating ring in engagement with the valve housing with the o-ring disposed between the first seating surface and the second seating surface in a compression fit and so that the disk-shaped poppet resides against the seating ring and projects an outward force thereon from the spring-biasing mechanism, wherein the o-ring is sized and fabricated to ensure maintenance of the seating ring and valve housing in fixed relation to each other notwithstanding the outward spring-bias force.

To restate, presented herein is an improved wafer style check valve which provides an enhanced fluid seal between the seating ring and valve housing by disposing an o-ring between the seating surfaces of the seating ring and housing. Further, the o-ring is sized and constructed to compression fit and snap lock between the seating ring and valve housing and thereby resist an outward axial biasing force against the seating ring imparted by a spring-bias mechanism coupled to the poppet within the valve housing and in sealing engagement against the seating ring. A uniquely configured lip is disposed on either the valve housing or the seating ring to ensure that the o-ring remains in axially fixed position between the seating ring and valve housing. In one embodiment, the snap-lock of the o-ring between the seating ring and valve housing is achieved by forcing the o-ring over this retaining lip. The compression and snap-lock fit of the o-ring between the seating ring and valve assembly allows elimination of the conventional screws used for temporarily securing the seating ring to the valve housing during transport and prior to operational installation of the check valve within a conduit between companion flanges. Advantageously, a check valve in accordance with the present invention is a functionally reliable design that is easy to fabricate. Further, the check valve can be readily disassembled in the field for repair if necessary.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
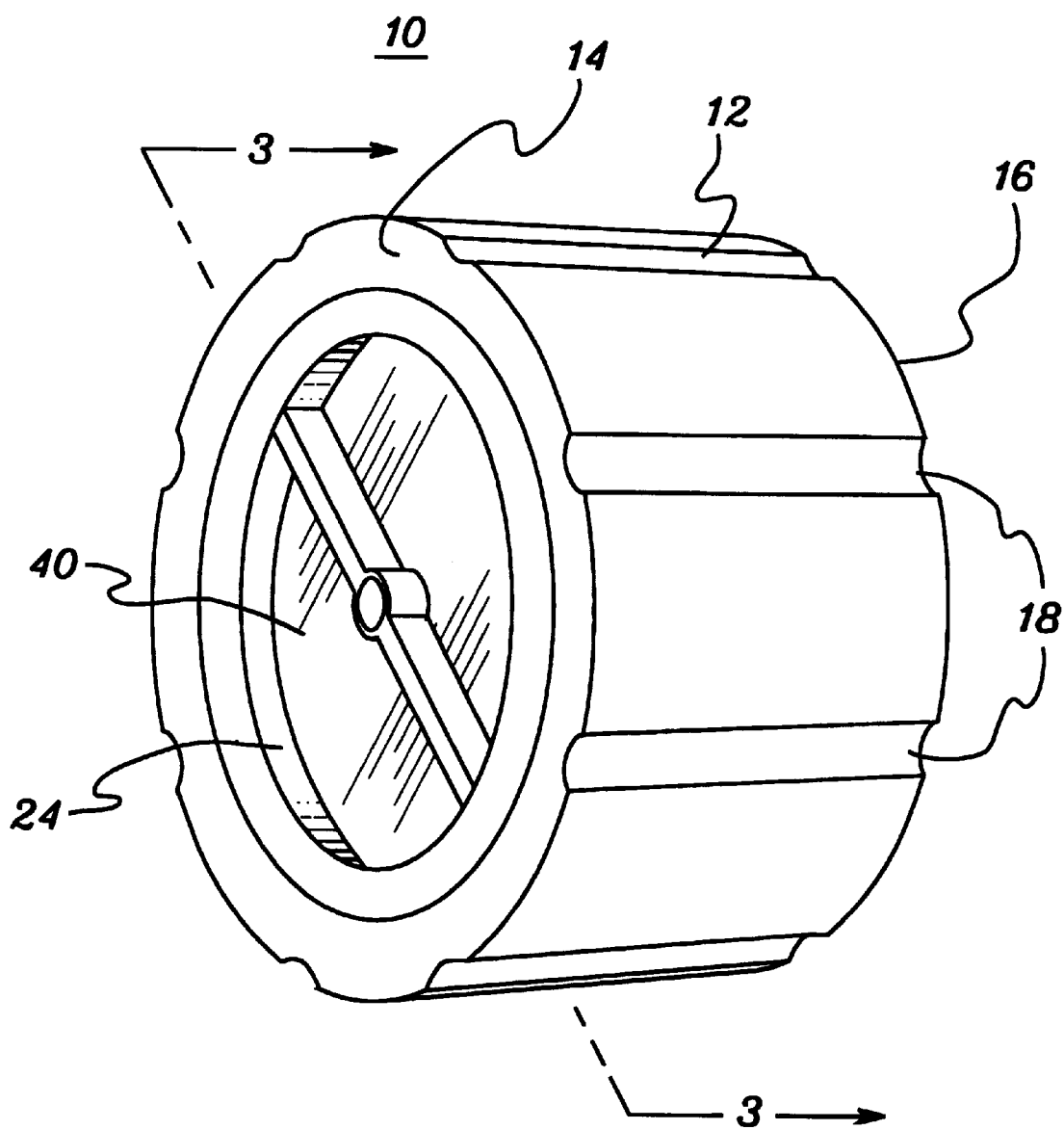
FIG. 1 is a perspective view of one embodiment of a wafer style check valve in accordance with the present invention.

FIG. 1 is a perspective view of a check valve 10 in accordance with the present invention. Valve 10 includes a valve housing or body 12 having opposite end faces 14 and 16. In this embodiment, end face 14 comprises an upstream end face, while end face 16 comprises a downstream end face. Upstream end face 14 includes the inlet to check valve 10, while downstream face 16 comprises the outlet of check valve 10. Check valve housing 12 is cylindrical in shape and contains a plurality of grooves 18 in an outer surface 20 as best shown in the axial view of FIG. 2. Each groove 18 is designed to accommodate a corresponding bolt 19 coupling companion flanges to check valve 10 when employed in operative position within a conduit as described further below. Downstream end face 16 of valve housing 12 includes an arm 21 (FIG. 3) across the outlet transverse to the fluid passageway within housing 12 defined between the inlet in upstream end face 14 and the outlet in downstream end face 16. This transverse arm 21 is best shown in the cross-sectional view of FIG. 3 taken along line 3—3 of FIG. 1.

Figure 2:
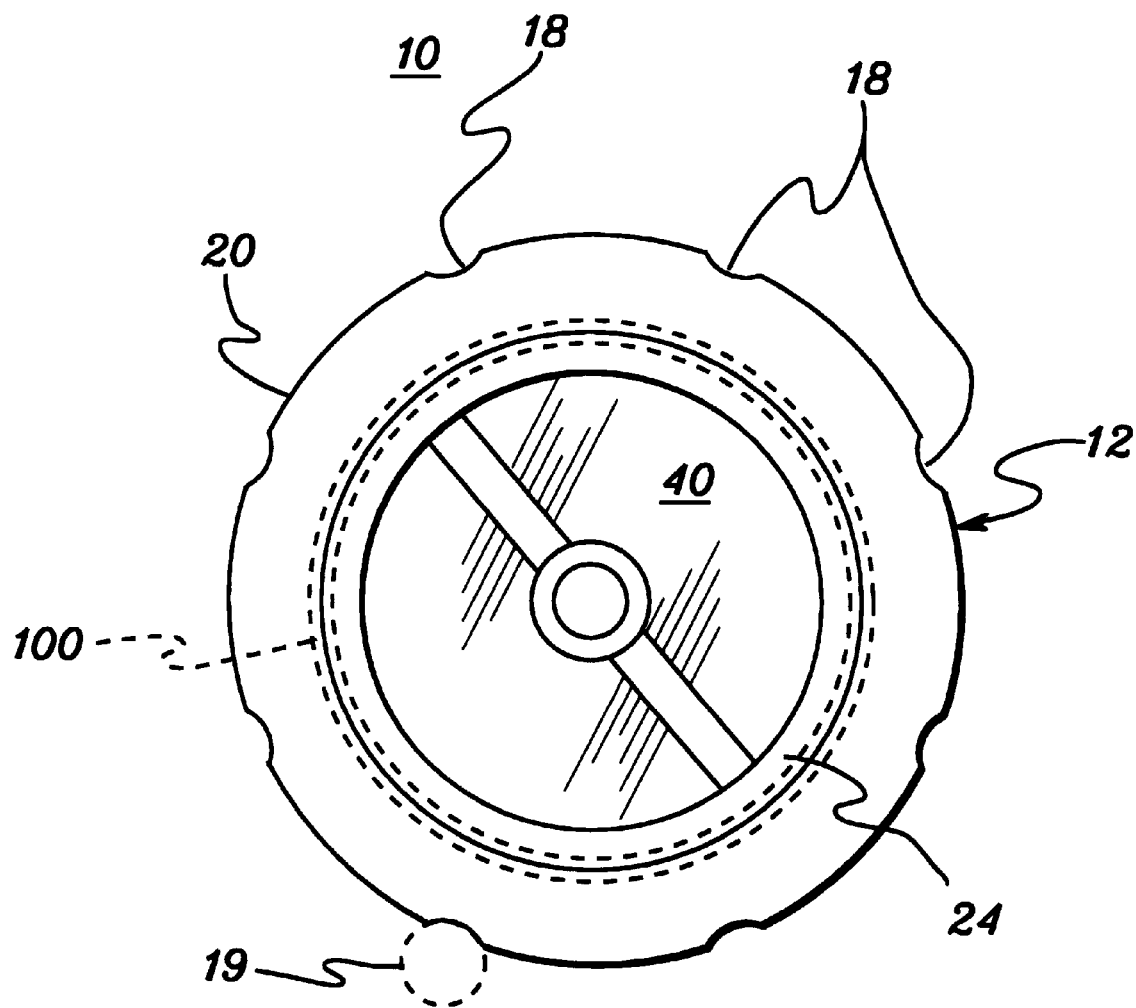
FIG. 2 is an axial view of the wafer style check valve of FIG. 1.
Figure 3:
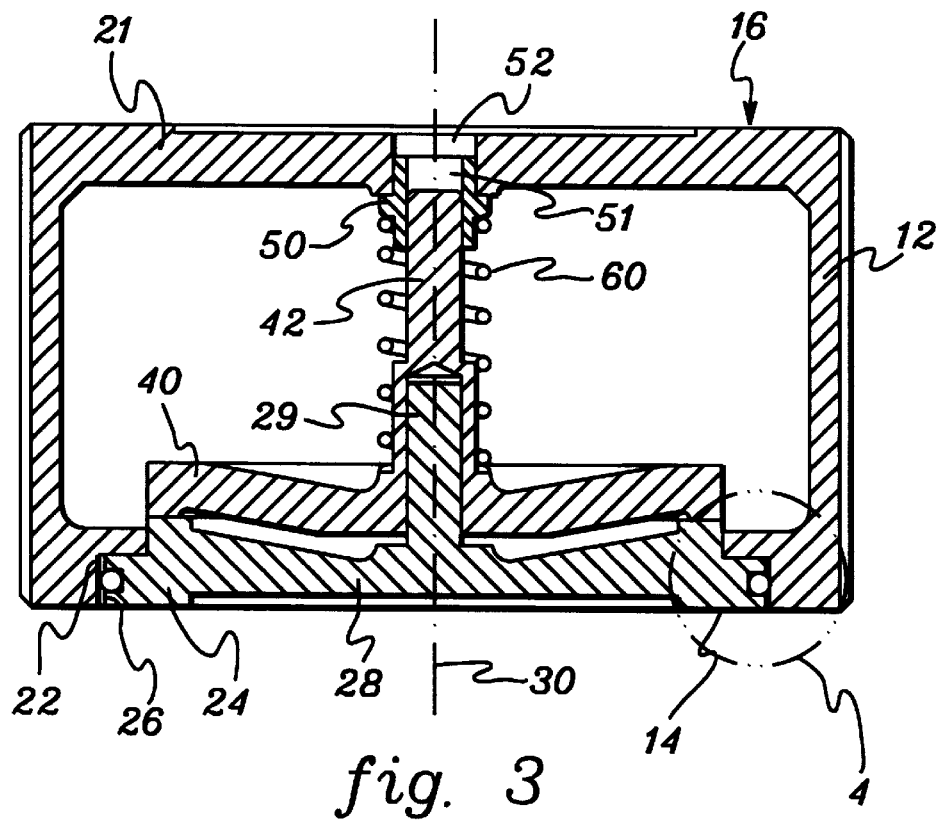
FIG. 3 is a cross-sectional view of the wafer style check valve of FIG. 1 taken along line 3—3.

As shown in FIGS. 1–3, upstream end face 14 of valve housing 12 receives a valve seat or seating ring 24. Valve housing 12 includes a first seating surface 22 which is in opposing relation with a second seating surface 26 at the circumference of seating ring 24 when seating ring 24 is disposed in engagement with valve housing 12. As described further below, the present invention provides a mechanism for establishing a compression fit between seating ring 24 and valve housing 12 to ensure retention of the seating ring within the housing when handling the check valve prior to operative installation within a conduit, and to ensure establishment of a seal between seating ring 24 and valve housing 12 when in use within the conduit.

As shown in FIG. 3, seating ring 24 includes an arm 28 extending transverse to the fluid passageway and an axial stem 29 extending from transverse arm 28 into housing 12. Within housing 12 a poppet 40 is spring 60 biased between an opening 51 in a bushing 50 at a first end and axial stem 29 at a second end such that poppet 40 is double guided. The two support points ensure that poppet 40 will reciprocate along axis 30 within valve housing 12. Bushing 50 is supported within an opening 52 in transverse arm 21 of valve housing 12. A stem 42 of poppet 40 reciprocates within center opening 51 of bushing 50. Spring 60 comprises the biasing mechanism for ensuring sealing closure of poppet 40 against seating ring 24 when no fluid pressure is applied at the inlet to check valve 12. In one example, the cracking pressure needed to open check valve 12 may be approximately one-half PSI.

Figure 4:
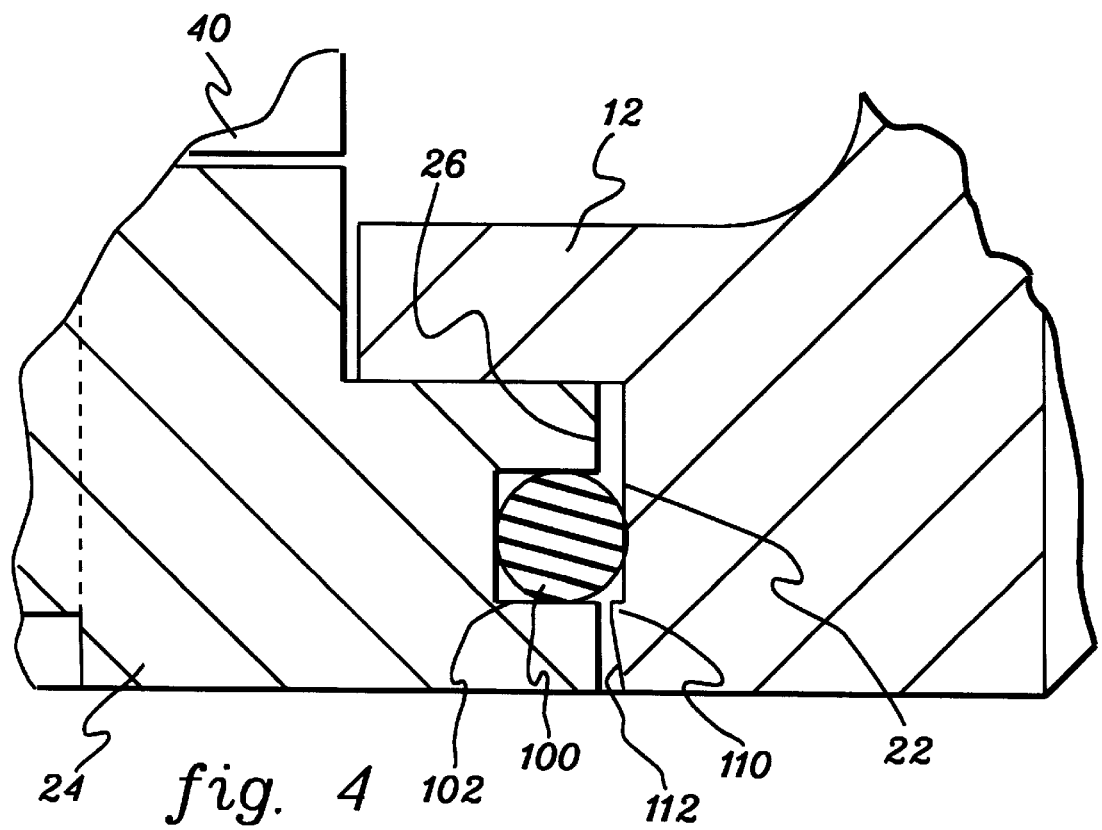
FIG. 4 is an enlarged view of the portion of the wafer style check valve of FIG. 3 within phantom line 4.

FIG. 3, and the partial enlargement thereof depicted in FIG. 4, illustrate one embodiment of a check valve feature in accordance with the present invention. In this embodiment, an o-ring 100 is shown partially disposed within a circumferential channel 102 formed in seating ring 24. In accordance with this invention, o-ring 100 is constructed and sized to accomplish two functions. Specifically, the o-ring serves as a sealing mechanism to ensure sealing engagement between first seating surface 22 and second seating surface 26. Secondly, o-ring 100 comprises a securing mechanism for ensuring that seating ring 24 remains fixedly positioned relative to valve house 12 when, for example, the check valve is in transit and being handled prior to installation within a conduit.

In this embodiment, first seating surface 22 of valve housing 12 includes a radially inwardly extending projection or retaining lip 110 which functions to further ensure fixed axial positioning of seating ring 24 relative to valve housing 12 by inhibiting outward movement of o-ring 100. Lip 110 may comprise a circumferential lip, or spaced bumps as desired to accomplish this function. Retaining lip 110 includes an angled portion 112 which facilitates manual press fitting of the combined seating ring 24 and o-ring 100 assembly into engagement with valve housing 12 during the fabrication process, or when reconstructing a check valve. In accordance with this invention, provision of retaining lip 110 and the sizing of o-ring 100 provide a snap-locking mechanism whereby when assembled, the o-ring snap-locks in place when press fit passed retaining lip 110.

The embodiment of the present invention depicted in FIGS. 3 & 4 is provided by way of example only. Various modifications thereto are possible while still accomplishing the above-set forth functions of the invention. For example, there could be no circumferential channel in seating ring 24, with the o-ring being compression fit between the first seating surface and the second seating surface, or there may be a circumferential channel in the first seating surface, or in both the first and second seating surfaces. Further variations may include the use of multiple o-rings between the seating ring and valve housing. Additionally, a retaining lip could be employed on both the first seating surface and the second seating surface, each of which may comprise a continuous lip or periodically spaced bumps about the circumference of the seating surface. The claims appended hereto are intended to encompass any such modifications.

By way of example, o-ring 100 may comprise a nitrile or fluorocarbon rubber compound. The o-ring is sized to ensure a tight press fit of seating ring 24 into upstream end face 14 of valve housing 12 such that a fluid tight seal is formed between first seating surface 22 and second seating surface 26 and such that seating ring 24 is held in substantially fixed position relative to valve housing 12.

Figure 5:
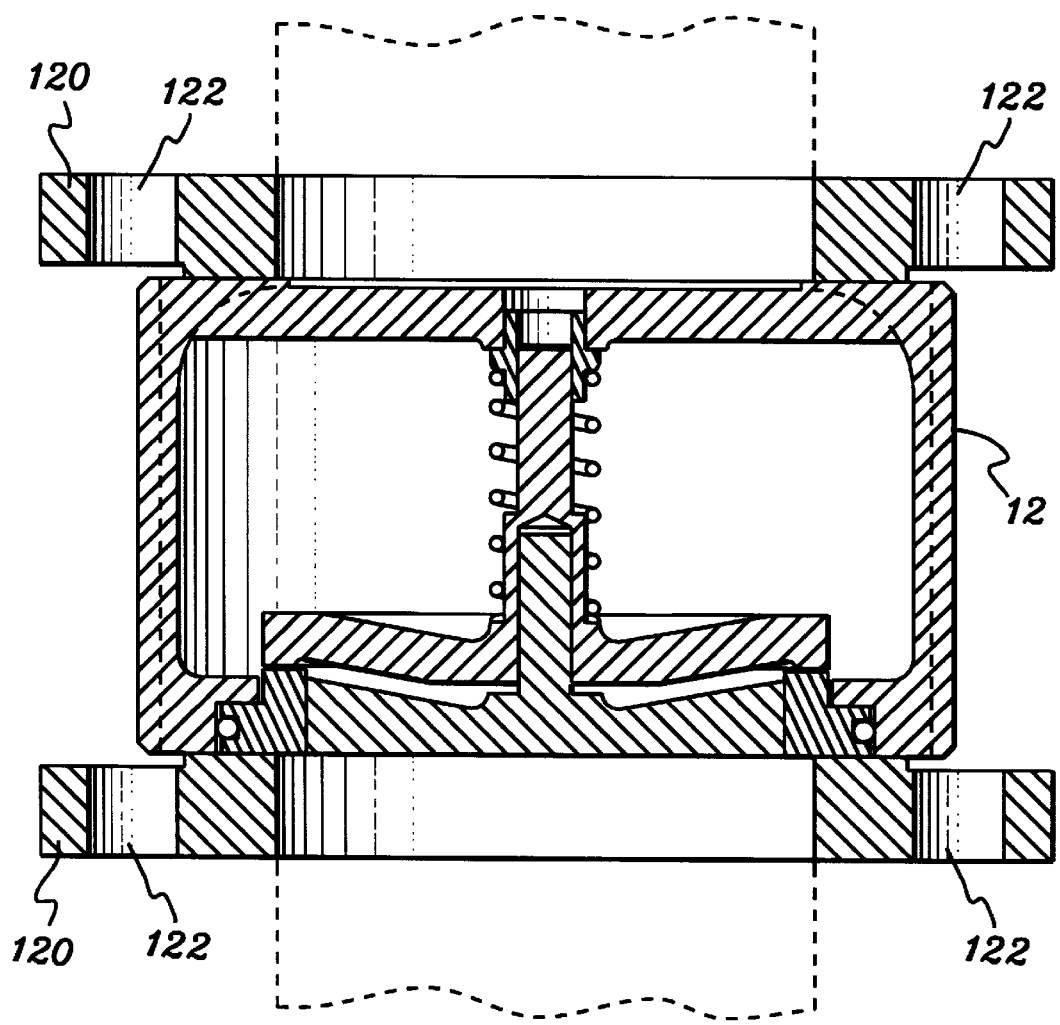
FIG. 5 is a cross-sectional view of the wafer style check valve of the present invention showing flanges employed in an operative installation of the check valve in a conduit (shown in phantom).

FIG. 5 depicts the cross-sectional view of FIG. 3 in accordance with the present invention wherein the check valve is positioned between compression flanges 120 with a conduit being shown in phantom axially aligned with the inlet and outlet of check valve 12. Once installed, pipe flanges 120 hold check valve 12 under compression by bolts (not shown) securely positioned within aligned openings 122 in flanges 120. Each pair of aligned openings 122 corresponds, in one example, to one groove 18 in the outer surface of valve housing 12.

Although principally depicted and described herein as a wafer style check valve, the o-ring and snap-locking mechanism of the present invention could be employed with other types of valves such as globe style check valves and globe style foot valves. Also, note that as used herein, "check valve" is inclusive of a foot valve.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

I claim:

1. A check valve comprising:

a valve housing having a pair of opposite end faces comprising an upstream end face and a downstream end face, said valve housing having a fluid passage extending axially therethrough between said upstream end face and said downstream end face;

a first seating surface formed within said valve housing around said fluid passageway and adjacent to said upstream end face;

a seating ring having a second seating surface adapted to engage said first seating surface; and an o-ring sized to reside between said first seating surface and said second seating surface when said seating ring and said valve housing are placed in engagement to axially maintain said seating ring and valve housing in fixed relation to each other and to seal fluid from passing between said first seating surface and said second seating surface, wherein said o-ring comprises both a mechanical support and a hydraulic support.

2. The check valve of claim 1, wherein at least one of said first seating surface and said second seating surface contains a circumferential channel therein, and wherein said o-ring is sized to only partially reside within said circumferential channel when disposed between said first seating surface and said second seating surface.

3. The check valve of claim 2, wherein said circumferential channel is disposed within said second seating surface of said seating ring, and wherein said first seating surface of said valve housing includes a retaining lip for ensuring that said o-ring remains axially in fixed position between said first seating surface and said second seating surface.

4. The check valve of claim 1, wherein at least one of said first seating surface and said second seating surface includes a retaining lip for ensuring that said o-ring remains in axially fixed position between said first seating surface and said second seating surface.

5. The check valve of claim 4, wherein said retaining lip is disposed on said first seating surface of said valve housing at said upstream end face.

6. The check valve of claim 1, wherein said check valve comprises a wafer style check valve.

7. The check valve of claim 1, further comprising spring-biasing for axially biasing said seating ring away from said valve housing, and wherein said o-ring maintains said seating ring and valve housing in axially fixed relation to each other notwithstanding said spring-biasing.

8. The check valve of claim 7, further comprising a poppet disposed between said spring-biasing and said seating ring when said seating ring is disposed in engagement with said valve housing with said o-ring disposed between said first seating surface and said second seating surface, said o-ring fixedly maintaining said seating ring and valve housing in axial position relative to each other.

9. The check valve of claim 1, wherein said o-ring is sized to ensure a compression fit when said o-ring is disposed between said first seating surface and said second seating surface with said seating ring and said valve housing in engagement.

10. The check valve of claim 1, wherein said o-ring is fabricated of a nitrile rubber compound or fluoro-carbon rubber compound.

11. The check value of claim 1, wherein said valve housing and said seating ring are free to separate without presence of said o-ring between said first seating surface and said second seating surface, said o-ring comprising said mechanical support for axially maintaining the seating ring and the valve housing in fixed relation to each other.

12. A check valve comprising:
a valve housing having a pair of opposite end faces comprising an upstream end face and a downstream end face, said valve housing having a fluid passage extending axially therethrough between said upstream end face and said downstream end face;
a first seating surface formed within said valve housing around said fluid passageway and adjacent to said upstream end face;
a seating ring having a second seating surface adapted to engage said first seating surface;
an o-ring sized to reside between said first seating surface and said second seating surface when said seating ring and said valve housing are placed in engagement to axially maintain said seating ring and valve housing in fixed relation to each other and to seal fluid from passing between said first seating surface and said second seating surface;
wherein at least one of said first seating surface and said second seating surface includes a retaining lip for ensuring that said o-ring remains in axially fixed position between said first seating surface and said second seating surface, and wherein said retaining lip is disposed on said first seating surface of said valve housing at said upstream end face; and
wherein said retaining lip comprises a radially inwardly angled retaining lip, said inward angling of said retaining lip facilitating assembly of said check valve with said o-ring disposed between said first seating surface and said second seating surface by facilitating snap locking of said o-ring between said first seating surface and said second seating surface.

13. A check valve comprising:
a valve housing having a pair of opposite end faces comprising an upstream end face and a downstream end face, said valve housing having a fluid passage extending axially therethrough between said upstream end face and said downstream end face;
a first seating surface formed within said valve housing around said fluid passageway and adjacent to said upstream end face;
a seating ring having a second seating surface adapted to engage said first seating surface;
an o-ring sized to reside between said first seating surface and said second seating surface when said seating ring and said valve housing are placed in engagement to axially maintain said seating ring and valve housing in fixed relation to each other and to seal fluid from passing between said first seating surface and said second seating surface; and
further comprising a double-guided poppet disposed within said valve housing between an axial stem of said seating ring and a spring mechanically coupled to said valve housing, said spring forcing said poppet into engagement with said seating ring and thereby applying an outwardly directed axial force to said seating ring.

14. A check valve comprising:
a valve housing having a pair of opposite end faces comprising an upstream end face and a downstream end face, said valve housing having a fluid passage extending axially therethrough between said upstream end face and said downstream end face;
a first seating surface formed within said valve housing around said fluid passageway and adjacent to said upstream end face,
a seating ring having a second seating surface adapted to engage said first seating surface;
an o-ring sized to reside between said first seating surface and said second seating surface when said seating ring and said valve housing are placed in engagement to axially maintain said seating ring and valve housing in fixed relation to each other and to seal fluid from passing between said first seating surface and said second seating surface;
wherein said o-ring is sized to ensure a compression fit when said o-ring is disposed between said first seating surface and said second seating surface with said seating ring and said valve housing in engagement; and
further comprising companion flanges for maintaining a compressive force between said upstream end face and said downstream end face when said check valve is placed in operative position within a conduit.

15. A method of manufacturing a check valve comprising:
   (i) providing a valve housing having a pair of opposite end faces comprising an upstream end face and a downstream end face, and a fluid passage extending axially through the valve housing between said upstream end face and said downstream end face, and wherein a first seating surface is formed within the valve housing around the fluid passageway and adjacent to the upstream end face;
   (ii) providing a seating ring having a second seating surface adapted to engage the first seating surface, and a disk-shaped poppet adapted to sealingly engage said seating ring;
   (iii) providing a spring-biasing mechanism for biasing said disk-shaped poppet against said seating ring;
   (iv) providing an o-ring sized to compressively reside between said first seating surface and said second seating surface when said seating ring and said valve housing are placed in engagement; and
   (v) assembling said valve housing, seating ring, disk-shaped poppet, spring-biasing mechanism and o-ring, said assembling comprising:
      disposing said spring-biasing mechanism and said disk-shaped poppet within said valve housing such that said disk-shaped poppet is axially spring-biased towards said upstream end face; and
      placing said seating ring in engagement with said valve housing with said o-ring disposed between said first seating surface and said second seating surface in a compression fit and so that said disk-shaped poppet resides against said seating ring and projects an axially outward force thereon from said spring-biasing mechanism, wherein said o-ring is sized and fabricated to ensure maintenance of the seating ring and valve housing in axially fixed relation to each other notwithstanding said outward axial spring-bias force such that said o-ring comprises both a mechanical support and a hydraulic seal.

* * * * *

UNITED STATES PATENT AND TRADEMARK OFFICE
CERTIFICATE OF CORRECTION

PATENT NO. : 6,024,121
DATED : February 15, 2000
INVENTOR(S) : Bo Andersson

It is certified that error appears in the above-identified patent and that said Letters Patent is hereby corrected as shown below:

ON THE TITLE PAGE:

Line 2, after "United States Patent [19]", delete "Anderson" and replace with --Andersson--.

Item [75] Inventor: Delete "Anderson" and replace with --Andersson--.

Item [73] Assignee: Delete "Glen Falls" and replace with --Glens Falls--.

Signed and Sealed this

Second Day of January, 2001

Attest:

Attesting Officer

Q. TODD DICKINSON
Commissioner of Patents and Trademarks